(12) United States Patent
Latta et al.

(10) Patent No.: US 8,762,320 B2
(45) Date of Patent: Jun. 24, 2014

(54) STATE MACHINE WITH OUT-OF-ORDER PROCESSING FUNCTIONALITY AND METHOD THEREOF

(75) Inventors: Michael Allen Latta, Loveland, CO (US); Christian W. Stassen, Newark, OH (US); Himansu Desai, San Jose, CA (US)

(73) Assignee: Drumright Group, LLC., Healdsburg, CA (US)

( * ) Notice: Subject to any disclaimer, the term of this patent is extended or adjusted under 35 U.S.C. 154(b) by 979 days.

(21) Appl. No.: 12/646,176

(22) Filed: Dec. 23, 2009

(65) Prior Publication Data

US 2011/0153546 A1 Jun. 23, 2011

(51) Int. Cl.
*G06N 5/00* (2006.01)
(52) U.S. Cl.
USPC .............................. 706/54; 712/220; 713/500
(58) Field of Classification Search
USPC ........................................................... 706/54
See application file for complete search history.

(56) References Cited

U.S. PATENT DOCUMENTS

2003/0065800 A1* 4/2003 Wyschogrod et al. ........ 709/230
2007/0094192 A1* 4/2007 Aurora et al. .................... 706/46

* cited by examiner

*Primary Examiner* — Jeffrey A Gaffin
*Assistant Examiner* — Kalpana Bharadwaj
(74) *Attorney, Agent, or Firm* — Blakely, Sokoloff, Taylor & Zafman LLP

(57) ABSTRACT

According to one embodiment of the invention, software operating as a state machine may be implemented within a digital device to support out-of-ordering processing of events by the state machine. Upon execution of the software by a processor, the following operations are performed. First, a determination is made if an incoming event is a transition, and if so, if the transition is not a transition associated with the current state of the state machine, but rather, is out-of-order from a predetermined order of transitions supported by the state machine. Upon determining that the transition is out-of-order, a determination is made whether the transition is to a reachable state such as a state prior to the current state of the state machine or to a future state from the current state. If so, the transition is allowed to be undertaken.

10 Claims, 7 Drawing Sheets

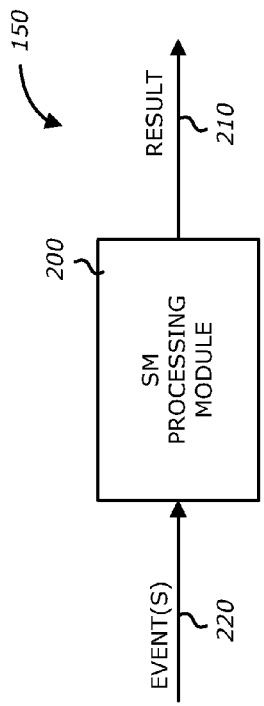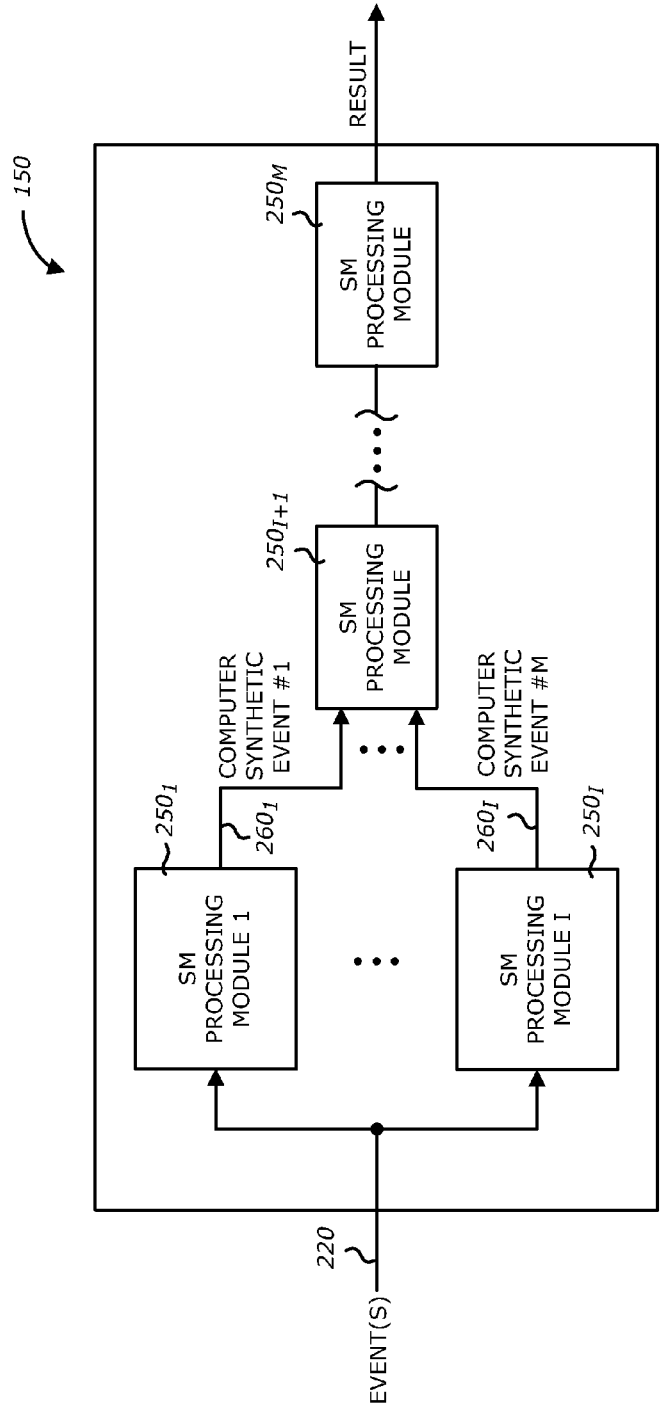

STATE MACHINE WITH OUT-OF-ORDER PROCESSING FUNCTIONALITY AND METHOD THEREOF

FIELD

Embodiments of the invention relate to state machines. More specifically, one embodiment of the invention relates to a state machine and its corresponding method of supporting out-of-order processing of input information.

BACKGROUND

In general, a finite state machine constitutes an event-driven system that makes a transition from one state to another provided that the condition defining the transition is determined to be true. More specifically, a "finite state machine" is a mechanism composed of states, transitions and actions. In general, a "state" is a point in the processing structure of a state machine. Each state defines a set of responses to inputs, and can be thought of as the culmination of past inputs, or the dividing line between past events and future events to be processed from that point forward. A "transition" indicates a state change and is described by a condition that would need to be fulfilled to enable the transition to occur. Each transition can also have one or more "effect" actions that are executed when a transition is being made from one state to another along a transition path. This allows specific processing to occur in response to events that cause a transition from one state to another. An "action" is a description of the processing to be performed as part of the processing of a state machine.

Traditional definitions of finite state machines such as used in Unified Modeling Language (UML) involve a strict interpretation of events from either a current state or a state hierarchy that is a situation where one state is subdivided into sub-states that can differentiate events within the enclosing state. For conventional UML-based, finite state machines, each state has a set of "entry" actions that are executed upon entering into a current state, "exit" actions that are executed upon exiting from the current state, and one or more "do activity" actions that are executed while in the current state.

One disadvantage associated with conventional finite state machines (FSMs) is that they operate on a linear sequence of events and transition from state to state as a result of those events being presented to the FSM. Conventional FSMs do not support out-of-order processing of input information.

BRIEF DESCRIPTION OF THE DRAWINGS

Embodiments of the invention may best be understood by referring to the following description and accompanying drawings that are used to illustrate embodiments of the invention.

FIG. 2A is an exemplary embodiment of a state machine processing module that is adapted to output a result in response to one or more detected events.

FIG. 2B is an exemplary embodiment of a state machine having a multi-level hierarchy of which first level state machine processing modules are adapted to output computer synthetic events to a second level state machine processing module to produce the result in response to the computer synthetic events.

DETAILED DESCRIPTION

Figure 1:
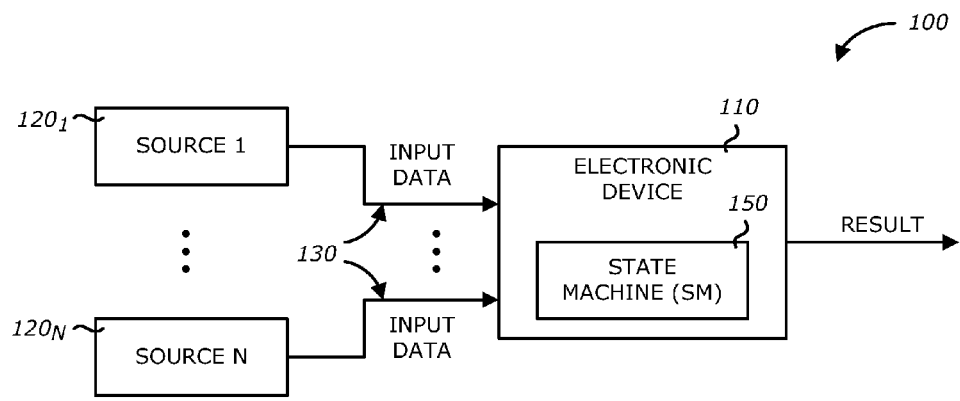
FIG. 1 is an exemplary diagram of a system featuring multiple input sources and comprising a state machine deployed as part of an electronic device according to one embodiment of the invention.

Herein, for the purposes of explanation, numerous specific details are set forth in order to provide a thorough understanding of the invention. It will be apparent; however, to one skilled in the art that the invention may be practiced without some of these specific details. In addition, the following description provides examples, and the accompanying drawings show various examples for the purposes of illustration. However, these examples should not be construed in a limiting sense as they are merely intended to provide examples of embodiments of the invention rather than to provide an exhaustive list of all possible implementations. Also, in some instances, well-known structures and devices are not shown in block diagram form in order to avoid obscuring the details of the disclosed features of various described embodiments.

In the following description, certain terminology is used to describe certain features of the invention. For instance, the term "communication link" is generally defined as an information-carrying medium that establishes a communication pathway. Examples of the medium include a physical medium (e.g., electrical wire, optical fiber, cable, bus traces, etc.) or a wireless medium (e.g., air in combination with wireless signaling technology). Also, the term "electronic device" is generally defined as any device that features components which control the operating state of that device. Examples of electronic devices include, but are not limited or restricted to a computer (e.g., server, mainframe, desktop, etc.), security equipment, a portable device (e.g., laptop, netbook, cellular phone, personal digital assistant "PDA," etc.), an embedded special purpose device, or the like.

Both terms "logic" and "module" are generally defined as hardware and/or software configured to process input information from one or more sources. Various examples of logic may include, but is not limited to a processor, a programmable circuit, combinatorial, an application specific integrated circuit (ASIC), or the like. The input information may include text, image(s), video or any combination thereof. The input information may be sent from the sources in a structured format (e.g., report) or in an unstructured format (e.g., loose without any accompanying information).

Another example of the logic may include a software module, which is generally describes as a series of executable instructions in the form of an application, an applet, a routine or even a sub-routine. The software module may be stored in any type of machine readable medium such as a programmable electronic circuit, a semiconductor memory device such as volatile memory (e.g., random access memory, etc.) and/or non-volatile memory such as any type of read-only memory (ROM) or flash memory, a portable storage medium (e.g., Universal Serial Bus "USB" drive, optical disc, digital tape), or the like.

A glossary of the terms associated with the functionality of a state machine that supports out-of-order processing of actions associated with states that differ from the current operating state is listed below:

1) Action: logic that is executed at a specified point in state machine processing;
2) Exit action: the action performed whenever exiting a state;
3) Entry action: the action performed whenever entering a state;
4) Do Activity action: the action performed when existing in the current state;
5) State: a specific point between events being processed;
6) Effect action: the action performed when a transition is undertaken;
7) Event: an occurrence in time that has significance to the system. Examples of an event may be signaling from a mouse click, a keystroke, a time tick, an arrival of a data packet, or the like. Events may also occur within the processing of a state machine rather than from external stimulus. These events are referred to as "synthetic" events, which are generated by the logic of the system to reflect significant events within the system itself;
8) Transition: one or more conditions (event and guard) needed to change from one state to another;
9) Guard: logic that is executed to decide if a transition can be taken;
10) Passing Guard: a guard that evaluates to "true";
11) Current state: the state defining how the state machine will respond to the next event received;
12) Composite state: a state that is subdivided into other states and can process transitions while remaining within the composite state. Transitions can either remain within the composite state or exit the composite state;
13) Concurrent composite: a composite state that allows independent processing within regions of its sub-states; and
14) Region: a subdivision of a composite state used to demark separate parts of a concurrent composite.

Referring to FIG. 1, an exemplary diagram of a system 100 that comprises a state machine 150 deployed as part of an electronic device 110 is shown. Unlike conventional state machines, state machine 150 recognizes and processes events that arrive out-of-order, where such processing now considers prior and/or future states when delivering an event to state machine 150. State machine 150 may be adapted as a flat state machine or a hierarchical state machine. The "flat state machine" handles event processing for states that are organized across a common level. A "hierarchical state machine" handles event processing for more complex state machine topologies such as nested states (referred to as "sub-states") within a composite state. For instance, hierarchical state machines can handle situations where event processing is specific to the composite state, but such processing is subdivided within among the sub-states. It can also handle the situation where activities are performed concurrently within the composite state.

According to this embodiment of the invention, system 100 includes a plurality of sources $120_1$-$120_N$ (N≥2), which are adapted to collect and transmit information to electronic device 110. According to one embodiment of the invention, each source $120_1$, . . . , and $120_N$ transmits information, which is individually or collectively utilized as "events" by state machine 150. This information may be received out-of-order from the actual events being recorded by sources $120_1$-$120_N$, where the delays that caused the out-of-order arrival of information are due to the particular methods and sources of collection used at each source, the transmission delays experienced for transmissions to the electronic device 110, or the like.

According to this embodiment of the invention, sources $120_1$-$120_N$ may be computers that are in communication with electronic device 110 over communication links 130. As an alternative embodiment, sources $120_1$-$120_N$ may include one or more handheld devices (e.g., cellular telephones, scanners, etc.) that are in communication with electronic device 110 over communication links 130. Communication links 130 may be adapted as part of a public network, but alternatively, may be configured to support dedicated (peer-to-peer) communications in providing a direct feed of information to electronic device 110. As yet another alternative, although not shown, at least one of sources $120_1$-$120_N$ may be directly attached to or part of electronic device 110.

Referring still to FIG. 1, electronic device 110 collects the out-of order information and this collected information is presented as events to state machine 150. State machine 150 analyzes the incoming events either sequentially (one at a time) or concurrently to determine if any one or a combination of events constitutes a transition. When the event(s) match a transition, the current state is consulted and the appropriate transition and actions are processed. More specifically, upon detecting that one or more of the incoming events constitutes a transition, state machine 150 processes the information associated with these events, where such out-of-order processing of events allows a transition to be taken when (i) the current state is a state prior to the start state of the transition and there are transitions from the current state to the start state or (ii) the current state is after the start state and there are transitions from the start state to the current state in order to return state machine 150 back to the current state.

Referring to FIG. 2A, a first exemplary embodiment of state machine 150 of FIG. 1 is shown. According to this embodiment of the invention, state machine 150 comprises at least one state machine (SM) processing module 200 that operates as a state machine by being adapted to output a result 210 in response to one or more detected events. In particular, SM processing module 200 receives incoming information 220 that is presented as one or more events. Incoming information 220 is analyzed serially, or in parallel for certain embodiments where information 220 is received from multiple sources concurrently. State machine processing module 200 determines if the information (event or combination of events) is a transition. When the event(s) match a transition, SM processing module 200 conducts out-of-order processing by allowing a transition to be taken if one of two conditions is met. First, the current state is a state that is prior to the start state of the transition (forward out-of-order processing) and there are transitions from the current state to the start state.

Second, the current state is after the start state (backward out-of-order processing) and there are transitions from the start state to the current state.

Referring now to FIG. 2B, a second exemplary embodiment of state machine 150 of FIG. 1 is shown, where state machine 150 is being implemented as a multi-level state machine featuring multiple SM processing modules. It is contemplated that other topologies are available for a system that is configured with multiple state machine modules that receive inputs and produce an aggregate output using synthetic events that are based on the input events and are transferred between the interconnected state machines.

More specifically, state machine 150 comprises a plurality of SM processing modules $250_1$-$250_M$ (M≥2) that collectively operate as state machine 150. According to this embodiment of the invention, a first set of SM processing modules $250_1$-$250_I$ (I≥2) are adapted to generate respective outputs $260_1$-$260_I$ in response to one or more detected events 220. In particular, SM processing module $250_1$ receives incoming information that is presented as events and determines if one or more of the events constitute a transition to a reachable prior or future state. The state is "reachable" if there are one or more transitions that would allow state machine processing to adjust from its current state to the reachable state. Outputs $260_1$-$260_I$ are transmitted as events to a second set of SM processing modules $250_{I+1}$-$250_M$ that perform the same out-of-order processing as described above. Hence, multiple SM processing modules are collectively used as state machine 150.

Figure 3A:
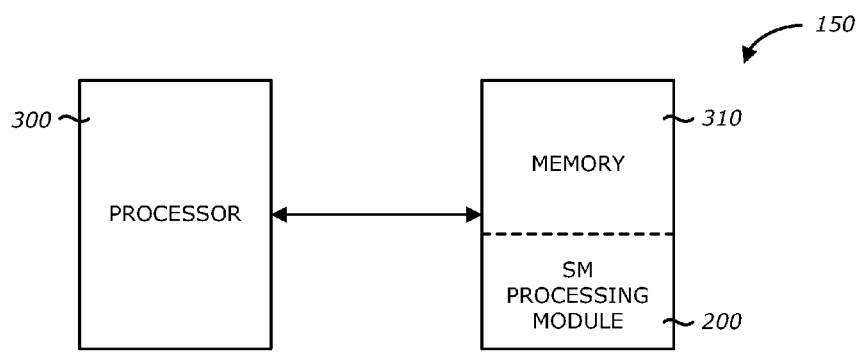
FIG. 3A is an exemplary embodiment of a state machine deployed as a software module within memory external to a processor.

Referring to FIG. 3A, a first exemplary embodiment of the general architecture of state machine 150 is shown. Herein, according to this embodiment of the invention, state machine 150 comprises a processor 300 in communication with a memory 310 that is contained in electronic device 110. Being non-volatile, memory 310 stores at least one state machine (SM) processing module 200. SM processing module 200 may be preloaded into memory 310 at manufacture or may be downloaded from an external storage device (not shown) by the original equipment manufacturer (OEM) of electronic device 110 or by the user.

Figure 3B:
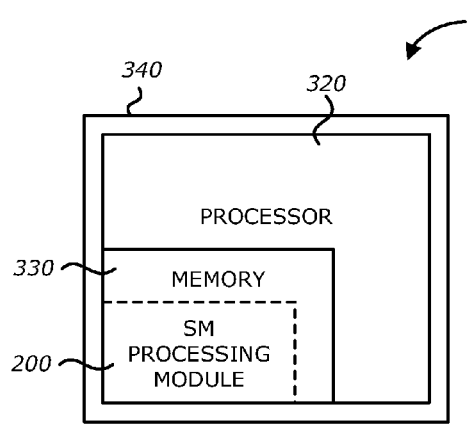
FIG. 3B is an exemplary embodiment of a state machine deployed as a software module within internal memory of the processor.

Referring now to FIG. 3B, a second exemplary embodiment of the general architecture of state machine 150 is shown. Herein, according to this embodiment of the invention, state machine 150 comprises a processor 320 with internal memory 330 that are both housed within the same semiconductor package 340. Being non-volatile, memory 330 stores at least one state machine (SM) processing module 200. Similarly, SM processing module 200 may be preloaded into internal memory 330 at manufacture or may be uploaded into internal memory 330 subsequently such as during set-up of electronic device 110.

Figure 3C:
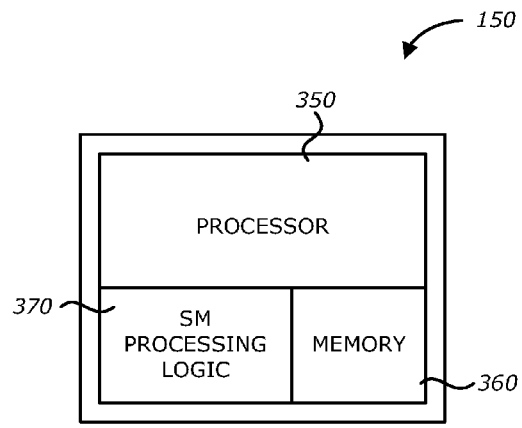
FIG. 3C is an exemplary embodiment of a state machine deployed as logic within the processor itself.

Referring now to FIG. 3C, a third exemplary embodiment of the general architecture of state machine 150 is shown. Herein, according to this embodiment of the invention, state machine 150 comprises a processor 350 with internal memory 360 and SM processing logic 370. For this embodiment, SM processing logic 370 is hardware implemented within a packaged product that features processor 350. For instance, SM processing logic 370 may be hardware that is formed as part of the integrated circuit forming processor 350 or as an integrated circuit that is packaged with processor 350. Examples of SM processing logic 370 may include, but is not limited or restricted to programmable logic, combinatorial logic, registers or the like.

Figure 4:
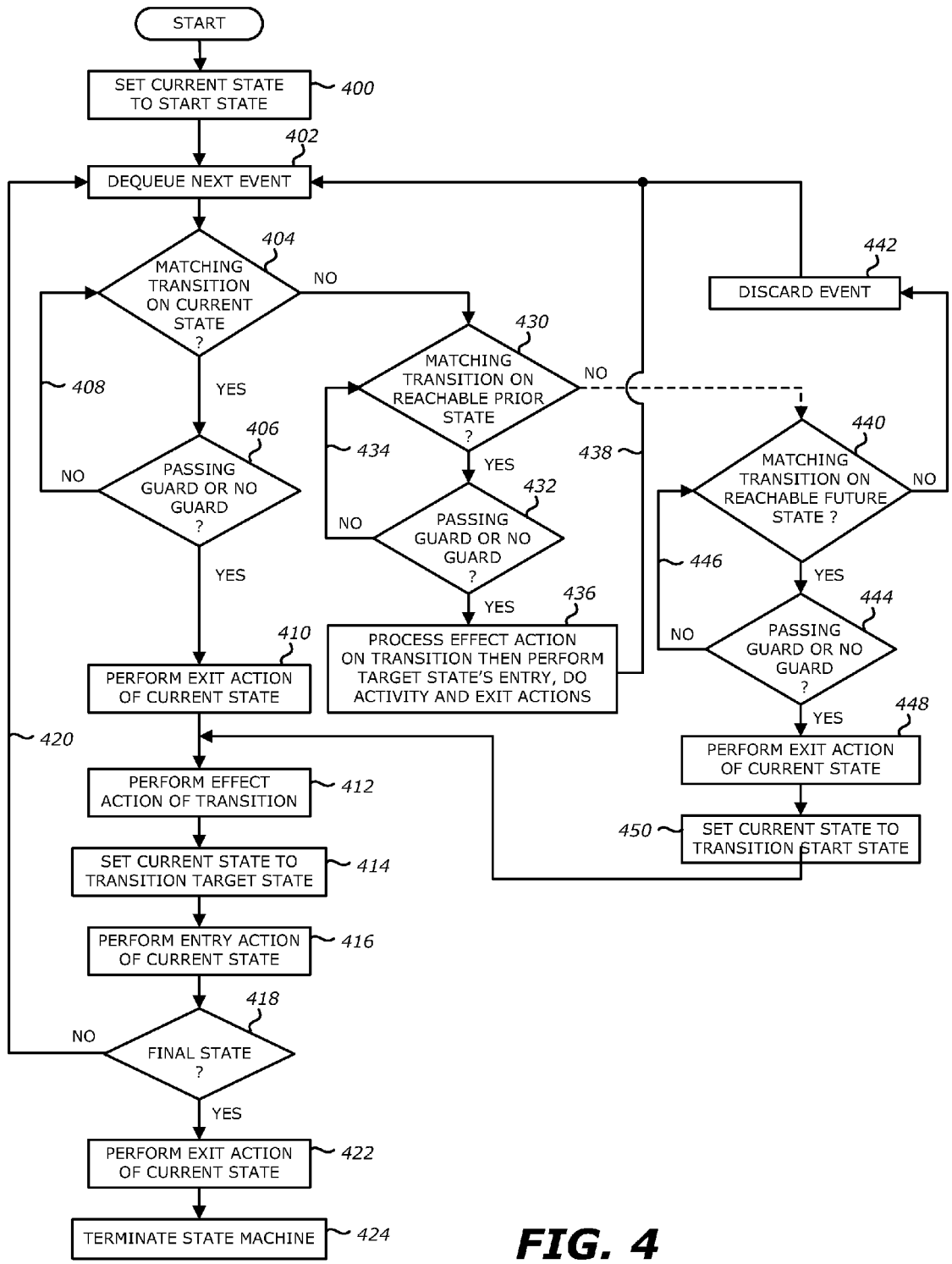
FIG. 4 is an exemplary embodiment illustrating the operations of the state machine to support out-of-order processing of events.

FIG. 4 is an exemplary embodiment of a flowchart illustrating the operations of state machine 150 to support out-of-order processing of events. First, the current state of the state machine is set to a start state, which is an indicator of a starting point for processing (item 400). Once the start state is set to the current state, an event is received. This event may be extracted from an event queue or received for processing in real-time (item 402). Thereafter, a determination is made as to whether the event matches a transition on the current state (item 404). According to one embodiment of the invention, the matching may be performed by conducting linear tests as to whether the event matches any transition from the current state.

If an event matches a transition in the current state, a determination is made whether the transition features a guard, and if so, whether the guard is satisfied (item 406). The guard determines if one or more conditions have been satisfied before allowing the transition to be undertaken. If not, the state machine cycles back to re-evaluate the event (item 408). If the guard is satisfied, an Exit action (if any) is performed for the current state and the Effect action of the transition is performed (items 410 & 412). Thereafter, the new current state is set to the targeted state from the transition (i.e. the transition target state) and an Entry action is performed (if any) for the new current state (items 414 & 416).

A determination is made whether the new current state is a final state for the state machine (item 418). If not, the next event is dequeued or enabled to be received (item 420). If the transition target state is a final state, the state machine performs an Exit action of the new current state and terminates operation (items 422 & 424).

However, if an event fails to match a transition of the current state (item 404), a determination is made whether the event matches a transition for a "reachable" prior state (item 430). In other words, the state machine returns to those prior states that offer transitions to the current state in order to check whether the event is a transition associated with any of these prior states. This analysis may be iterative so that all states that are reachable to the current state, including both prior states that offer direct transitions to the current state and those prior states that merely offer indirect transitions to the current state are analyzed.

If the event matches a transition for a reachable prior state, a determination is made whether the guard (if present) is satisfied, namely if one or more conditions have been satisfied before allowing this transition to be undertaken (item 432). If not, the state machine cycles back to re-evaluate the event in comparison of transitions on reachable prior states (item 434). If the guard is satisfied, however, an Effect action of the transition is performed while the current state remains to be the operating state of the state machine. Thereafter, an Entry action (if any) is performed for entry into the transition target state, Do Activity actions are performed and an Exit action (if any) is conducted to exit the transition target state (item 436). Thereafter, the next event is recovered or enabled to be received (item 438).

If an event fails to match a transition of the current state or a reachable prior state, a determination is made whether the event matches a transition for a reachable future state (item 440). This determination analyzes any future states which are potential transitions from the current state. If the event fails to match a transition for a reachable future state, the event is discarded (item 442). However, if the event matches a transition for a reachable future state, a determination is made whether the guard (if present) is satisfied (item 444). If not, the state machine cycles back to re-evaluate the event in comparison to reachable future states (item 446). If the guard is satisfied, however, the state machine performs an Exit action (if any) to exit from the current state and sets the new current state as the transition start state (items 448 & 450). Thereafter, the operations continue starting with item 412.

Figure 5A:
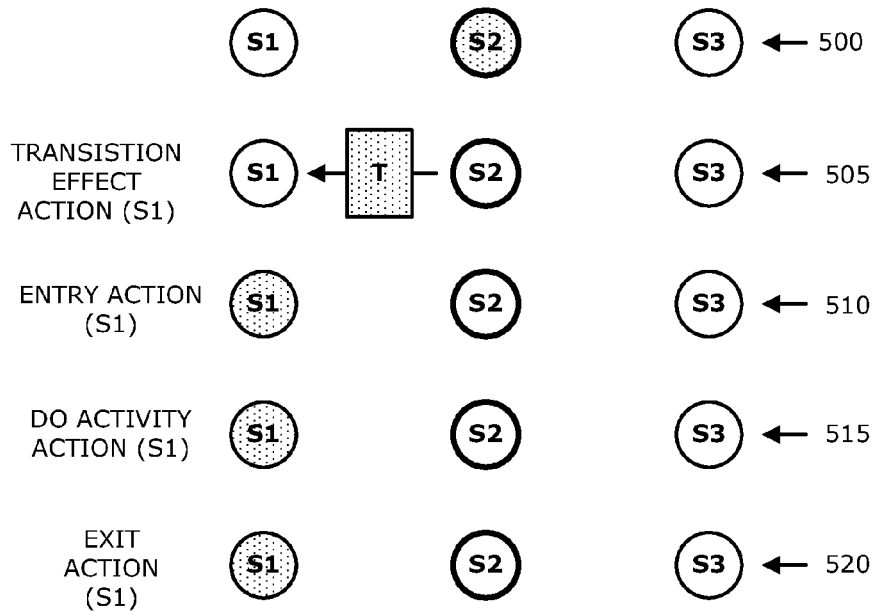
FIG. 5A is an exemplary state diagram illustrating out-of-order processing of actions for a state proceeding a current operating state of the electronic device of FIG. 1.

Referring to FIG. 5A, an illustrative embodiment of the state topology of state machine 150 having three states and conducting out-of-order processing based on matching an event to a reachable prior state is shown. Herein, the current operational state of the state machine is set to a second operating state (S2) as represented by bold outlining in operation 500. S2 is also its executing state as represented by shading. In operation 505, upon detecting that the event matches a transition for a reachable prior state, the state machine processes a Transition Effect action as denoted by the identifier "T". The processing of the Transaction Effect action occurs prior to altering the executing state of the state machine to a prior state S1. However, during this and subsequent operations in processing the event, the operating state of the state machine remains in the S2 state although the executing state reverts back to the S1 state.

In operation 510, the state machine performs an Entry action for S1, which is one or more actions performed by the state machine for entering into S1 state. Thereafter, in operation 515, the state machine may conduct one or more Do Activity actions, namely actions that are performed by the state machine while it is executing in the S1 state. Thus, a sequence of actions is performed while honoring the semantics of the state machine while performing out-of-order processing. Thereafter, upon completion of the Do Activity processing, the state machine performs an Exit action to exit from the S1 state (operation 520). As a result, the state machine reverts back to the S2 state.

Figure 5B:
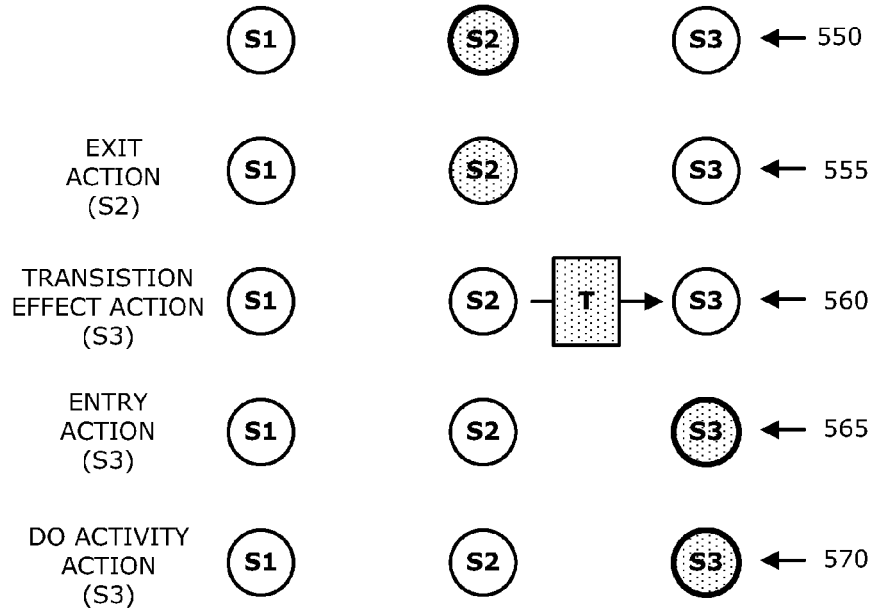
FIG. 5B is an exemplary state diagram illustrating out-of-order processing of actions for a state subsequent to the current operating state of the electronic device of FIG. 1.

Referring to FIG. 5B, an illustrative embodiment of the state topology of state machine 150 having three states and conducting out-of-order processing based on matching an event to a reachable future state is shown. Herein, in operation 550, the state machine is presently in a second operating state (S2) as represented by bold outlining. S2 is also its executing state as represented by shading. Upon detecting that the event matches a transition for a reachable future state, in operations 555 and 560, the state machine processes an Exit action to exit from S2 and subsequently processes a Transition Effect action to alter the executing and operational state of the state machine to a future reachable state (S3). Thereafter, in operation 565, the state machine performs an Entry action, which constitutes one or more operations that are performed by the state machine upon entering into the S3 state. Thereafter, after being placed in the S3 state, the state machine conducts one or more Do Activity actions and continues execution in the S3 state. Unlike the detection of a reachable prior "S1", state in FIG. 5A, upon detecting an event constitutes a transition at a "reachable future state, the state machine sets its operating state as that reachable future state.

Figure 6A:
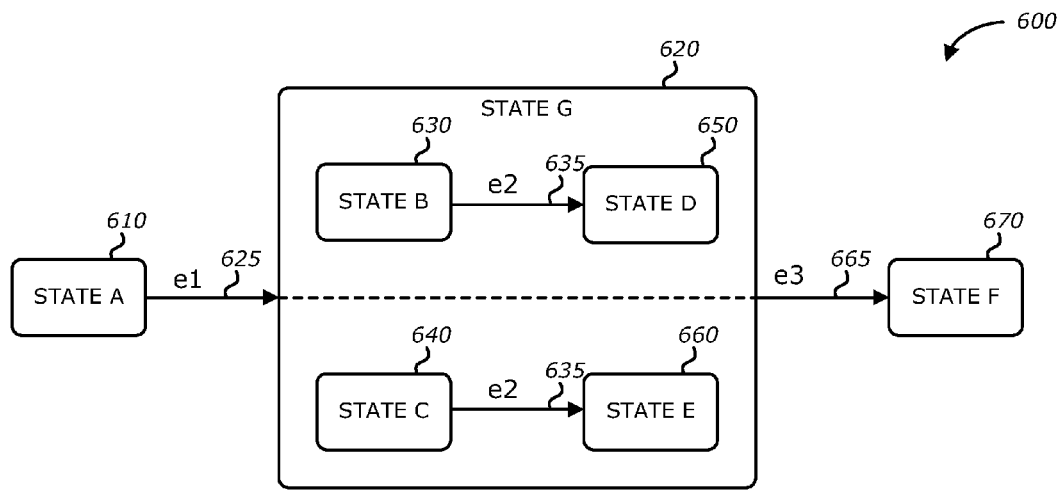
FIG. 6A is a first illustrative embodiment of hierarchical state machine processing by state machine 150 of FIG. 1.

As shown in FIG. 6A, as a first illustrative embodiment, hierarchical state machine processing 600 for state machine 150 of FIG. 1 is shown. For this example, the hierarchical state processing involves three states; namely state A 610, state F 670 and concurrent composite state G 620. State A 610 transitions to state G 620 in response to a first event (e1) 625. After processing the transition 625, the state machine enters sub-state B 630 and sub-state C 640. Within composite state G 620, after a second event (e2) 635, the state machine transitions to sub-state D 650 and sub-state E 660, respectively. The state machine transitions to state F 670 in response to a third event (e3) 665. As with prior examples entry actions, effect actions, and exit actions are performed when a state is entered, a transition is taken, or a state is exited. Do activity actions are executed while the state machine is within each state as appropriate as well.

Figure 6B:
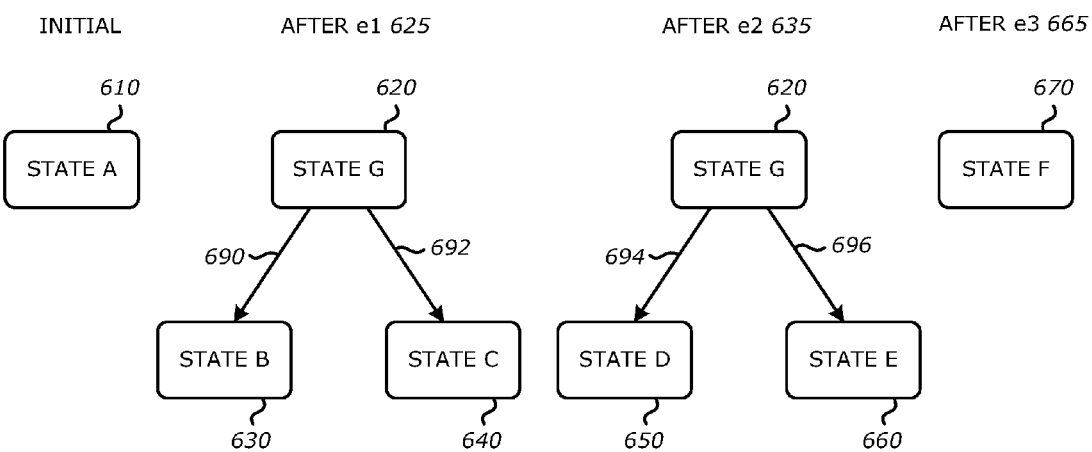
FIG. 6B is a first exemplary embodiment of a state tree diagram for the hierarchical state machine processing of FIG. 6A.

As shown in FIG. 6B, a root of a state tree as shown is an example of the current state in the upper most state. For instance, where the current state is composite state G 620, the tree has one "branch" node 690, 692, 694, 696 for each sub-state 630, 640, 650, 660 of composite state G 620 that is active. These tree branches 690, 692, 694, 696 illustrate regions that specify which parts of the composite state G 620 are active concurrently. Since there can be only one current state for each region, the state tree has one branch for each region of each current composite state.

Referring back to FIG. 6A, as a second illustrative embodiment, hierarchical state machine processing 600 for state machine 150 of FIG. 1 performing out-of-order processing is shown. For this example, the hierarchical state processing involves three states; namely state A 610, state F 670 and concurrent composite state G 620. While in state A 610, hierarchical state processing detects third event (e3) 665. Upon determining that third event (e3) 665 matches a transition for a reachable future state (state F 670) and any guard (if implemented) associated with the transition has been satisfied, an Exit action from state A 610 is performed. Thereafter, Effect and Entry actions are performed to set the current state to state F 670, which now constitutes the transition start state. Thereafter, Do Activity actions are executed while the state machine is within state F 670.

While in State F 670, hierarchical state processing detects first event (e1) 625. Upon determining that first event (e1) 625 matches a transition for a reachable prior composite state (state G 620) and any guard (if implemented) associated with this transition has been satisfied, Effect and Entry actions to sub-state B 630 and sub-state C 640 are performed. Upon completion of Do Activity actions within these sub-states, Effect and Entry actions are performed to set the current state to State F 670, which now constitutes the transition start state. Thereafter, upon completion of the Do Activity processing, the state machine performs an Exit action to exit from the sub-state B 630 and sub-state C 640. As a result, the state machine reverts back to state F 670 and out-of-order processing of events has been handled.

Figure 7A:
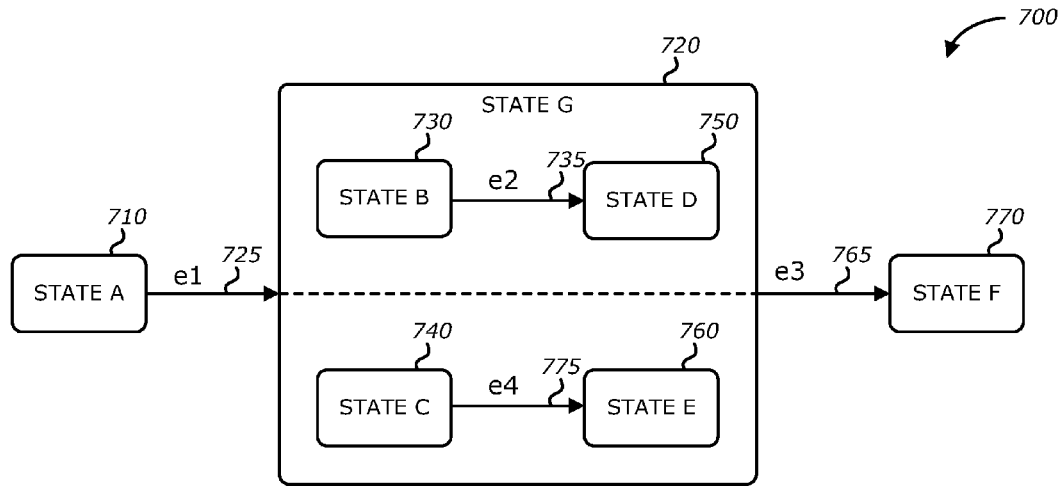
FIG. 7A is a second illustrative embodiment of hierarchical state machine processing by state machine 150 of FIG. 1.

Similarly, as shown in FIG. 7A, as a second illustrative embodiment, hierarchical state machine processing 700 for state machine 150 of FIG. 1 is shown. For this example, the hierarchical state processing involves three states; namely state A 710, state F 770 and composite state G 720. State A 710 transitions to state G 720 in response to a first event (e1) 725. After processing the transition 725, the state machine enters sub-state B 730 and sub-state C 740. After a second event (e2) 735, the state machine transitions to sub-state D 750. The state machine transitions to state F 770 in response to a third event (e3) 765. Note that a fourth event (e4) is no longer viable once the state machine transitions out of state G 720 to state F 770.

Figure 7B:
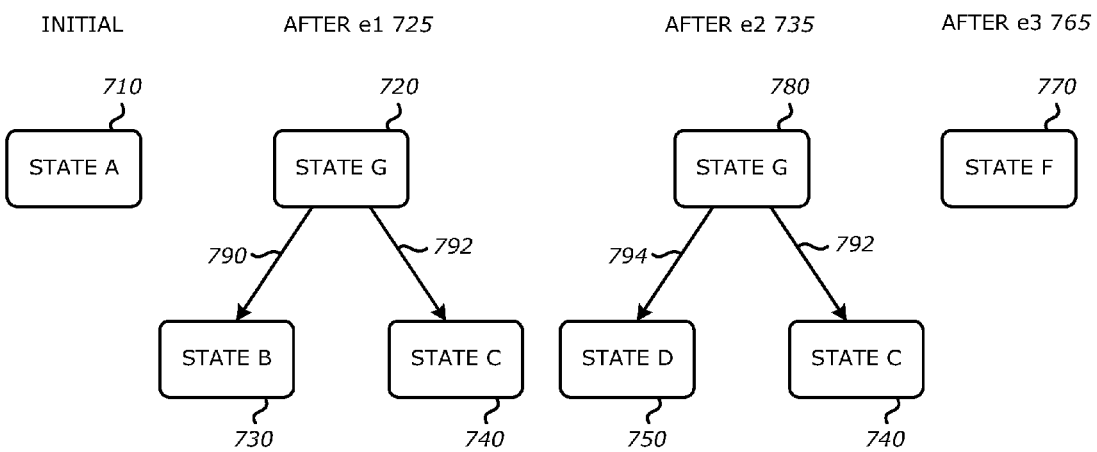
FIG. 7B is a second exemplary embodiment of a state tree diagram for the hierarchical state machine processing of FIG. 7A.

As shown in FIG. 7B, where the current state is composite state G 720, the tree has "branch" nodes 790 and 792 for sub-states 730 and 740, respectively. After second event 735, branch node 794 represents the transition from sub-state 730 to sub-state 750. These tree branches 790, 792, 794 illustrate regions that specify which parts of composite state G 720 are active concurrently. Since there can be only one current state for each region, state tree 780 has one branch for each region of each current composite state.

Returning to FIG. 7A, an example of forward out-of-order processing would occur if the state machine starting in state A 710 received third event (e3) causing the transition from state A 710 through transition 765 to state F 770. The receipt of a fourth event (e4) would then cause prior state out-of-order processing leaving state F current, but performing the transition 775, and all actions associated with state E 760.

Another example with FIG. 7A involves out of order processing where the state tree would be starting in state A 710 and receiving fourth event (e4). This would require forward out-of-order processing. The Exit action if any for state A 710 would be executed, then the transition 775 would be processed, followed by the Entry action for state E 760. During this time the state tree tracks the activity. After the Exit action for state A 710 the state tree would have state A removed, followed by adding of state G 720 just prior to processing the Entry action for G 720. Once the Entry action for G 720 completes the processing for each region is performed. The region with state B as the start state will enter state B as there is no other state indicated by event e4 that would alter that behavior. For the region starting with state C 740, the out of order processing dictates that transition 775 be processed and then the Entry action for state E 760. The state tree maintains one active state for each region. When composite states are nested this repeats for each composite state enclosing any active state.

Figure 8:
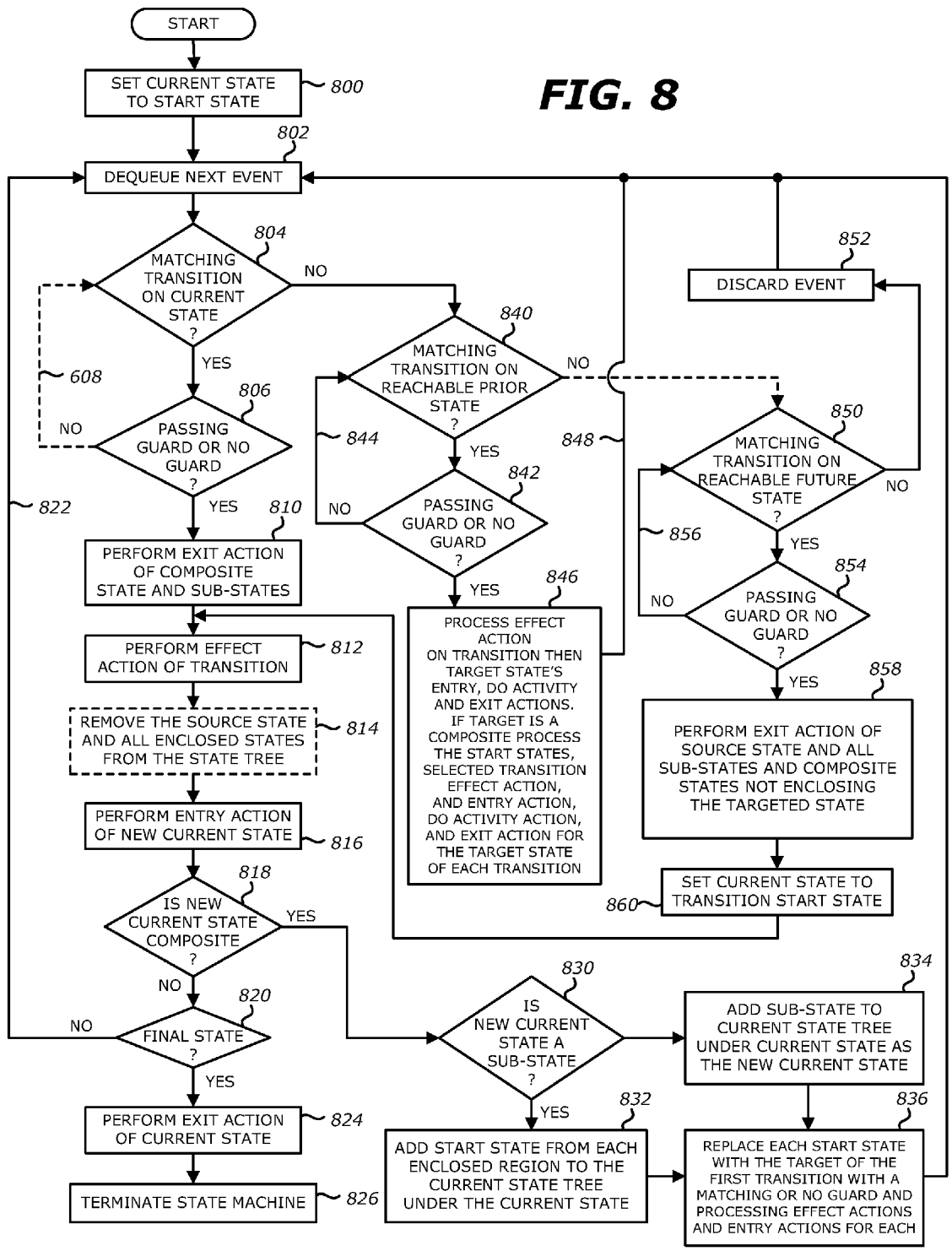
FIG. 8 is an exemplary embodiment illustrating the operations of a hierarchical state machine that supports out-of-order processing of events.

FIG. 8 is an exemplary embodiment of a flowchart illustrating the operations of hierarchical state machine 150 to support out-of-order processing of events. First, the current state of the state machine is set to a start state, which is an indicator of a starting point for processing (item 800). Once the start state is set to the current state, an event is received. For instance, the event may be extracted from an event queue or received for processing in real-time (item 802). Thereafter, a determination is made as to whether the event matches a transition on the current state (item 804). This matching may be performed by conducting linear tests as to whether the event matches any transition from the current state. Alternatively, the transitions from the current state, as well as the transitions for other states that are reachable to the current state, may be stored in a database. For the later embodiment, the event is compared to the contents of the database.

If an event matches a transition in the current state, a determination is made whether the transition features a guard, and if so, whether the guard is satisfied. As previously stated, the guard determines if one or more conditions have been satisfied before allowing the transition to be undertaken (item 806). If not, the state machine cycles back to re-evaluate the event (item 808). If the guard is satisfied, however, an Exit action (if any) is performed for the current state (composite state), including all sub-states that are associated with the current state and are not associated with a targeted state resulting from the transition (item 810). Thereafter, an Effect action of the transition is performed (item 812). The composite state and its sub-states may be removed from the current state tree, which is an organization of states used to record the current state in each composite state and the state machine as a whole.

As an example, when a transition is taken in the context of a composite state, any states not "enclosing" the target state are removed. In other words, those states in which the target state is not a sub-state of are removed from the current state tree. If the start state for example is part of composite states C1, C2, and C3 and the target is only in composite states C1, C2, then composite state C3 will be removed from the current state tree.

Referring still to FIG. 8, the state machine performs an Entry action of the new current state (item 816). A determination is made whether the new current state is a composite state that supports one or more sub-states (item 818). If the new current state is not a composite state, a determination is made whether the new current state is a final state for the state machine (item 820). If not, the next event is dequeued or enabled to be received (item 822). If the new current state is a final state, the state machine performs an Exit action for the current state and terminates its operation (items 824 & 826).

However, if the new current state is a composite state, a determination is made whether the new current state is a sub-state (item 830). If so, the start state from each sub-state is added to the current state tree under the current state (item 832). If not, the sub-state is added to the state tree under the current state as the new current state (item 834). Regardless whether the new current state is a sub-state or not, each start state is replaced with the target of the first transition (with a matching or no guard) and processing Effect actions and Entry actions for each start state (item 836). When existing one or more composite states (covered by 836) the state machine should remove all sub-states present in the state tree. This is required so that the transition out of the composites leave the state tree in a clean form representing only the active states at that point in time. When entering a state within nested composites (as covered by 832) the state tree should be reconstructed to represent all enclosing composite states to leave the state tree representing all active states at that point in time. Because of the out-of-order processing, this tear-down and build-up operations should at times process several nested composite states, which in sequential processing would happen one at a time as part of entering or existing the composite states sequentially.

If an event fails to match a transition of the current state, a determination is made whether the event matches a transition for a reachable prior state (item 840). As previously mentioned, this determination involves an analysis of any prior states that directly or indirectly offer transitions to the current state in order to check the transitions for these states. If the event matches a transition for a reachable prior state, a determination is made whether a guard is associated with the transition (item 842). If not, the state machine cycles back to re-evaluate the event in comparison with reachable prior states (item 844). If so and the guard is satisfied, an Effect action for the transition is performed. If the target state is a composite state, the state machine processes the start states, the selected Transition Effect action and corresponding Entry action, Do Activity action and Exit action for the target state of each transition (items 846 & 848).

If an event fails to match a transition of the current state or a reachable prior state, a determination is made whether the event matches a transition for a reachable future state (item 850). This determination analyzes transitions associated with any future states that can be transitioned from the current state. If the event does not match a transition for any reachable future states, the event is discarded (item 852). If the event matches a transition for a reachable future state, a determination is made whether a guard is associated with the reachable future state (item 854). If not, the state machine cycles back to re-evaluate the event in comparison to transitions associated with reachable future states (item 856). If so and the guard is satisfied, an Exit action of the current composite state and its sub-states is performed (item 858). Thereafter, the state machine sets the current state to a transition start state (item 860) and continues processing starting at item 812.

As described above, one embodiment of the invention may be the implementation of an electronic device that is fed information as events and attempts to match those events to a state machine defining a process to be recognized. The data presented as events can be collected out-of-order from the actual events being recorded, and therefore, allows for processing transitions out-of-order. In this embodiment of the invention, the electronic device will receive data as it becomes available which may have different delays based on methods and sources of collection. The data being presented to the state machine is matched one at a time, or concurrently, to the state machine as events. When events match transitions the current state is consulted and the appropriate transition and actions are processed.

The use of synthetic events generated from one state machine and fed into another state machine allows the decomposition of the recognition into modular units of work that can work bottom-up in processing the incoming data. As each state machine receives events that satisfy its purpose, they can publish new synthetic events that are processed by "higher level" state machines. There is no limit placed on the depth of the resulting hierarchy, nor a restriction on mixing synthetic and input events.

The information about which states have been processed, and which have been skipped over may be stored in non-volatile memory to support processing of events over time, and recover from computer restarts or failures. Of course, such storage may be performed through the use of volatile memory, which does not allow for recovery from system failure or restart.

Applications of this embodiment would include detecting unauthorized or lawful activity at military or civilian areas (e.g., public transport areas such as airports, bus terminals, train stations, banks, public buildings, etc.). Such use would take the input data fed into state machines designed to match behaviors or activities that are indicative of the target group or individual. The observations or data records being fed are introduced in the order acquired, which may not match the order observed or when the action occurred. The state machines would allow the matching events to be extracted from a larger stream of data.

In this embodiment the timing of the activities represented by the input data can be compared to the sequencing of the state machine states to evaluate the quality of the fit after the data has been processed. Since the data arrives in a different order from its occurrence the quality of fit must be reevaluated after each event that matches a transition, or at defined times such as when all available events have been processed.

Alternatively, another embodiment of the invention would be the use of the state machine for processing a network protocol that supported sending data along differing paths that have different latencies. This would present a case where the data packets can arrive out of order to the receiving computer system. The invention could be used to match the incoming packets to the state machine for the protocol, while dealing with the out of order arrival.

In this embodiment of the invention, the storage for current and past states would most likely be held in volatile memory as the processing of network traffic would not survive a system failure or restart in any case. Further the actions would want to verify all states had been matched at some points to ensure complete receipt of the protocol packets before beginning a new message sequence. Applications for this embodiment would include protocol verification, testing, and embedding in a protocol driver for diagnostic purposes. It could also be useful in processing a protocol by placing data in the proper place in the protocol for processing at specific points in the processing cycle.

Having disclosed exemplary embodiments and the best mode, modifications and variations may be made to the disclosed embodiments while remaining within the scope of the embodiments of the invention as defined by the following claims.

What is claimed is:

1. A state machine that supports out-of-order processing of events, comprising:
   a memory to store information directed to transitions that are supported by the state machine;
   logic in communication with the memory, the logic to (i) determine if an incoming event is a transition associated with a current state, (ii) determine if the transition is out-of-order from a predetermined order of transitions supported by the state machine, (iii) determine if the out-of-order transition is to a reachable state that is either a state prior to the current state of the state machine or a future state from the current state of the state machine, (iv) allow the transition to be undertaken if the transition is to the reachable state, and (v) perform a plurality of transitions associated with operations (i)-(iv) concurrently,
   wherein upon determining if the out-of-order transition is to the reachable state being a state prior to the current state, the logic alters an executing state of the state machine as the prior state, performs one or more actions for entry into the prior state, performs one or more actions while executing within the prior state, and exits the prior state to revert back to the current state.

2. A non-transitory machine readable medium including software that, when executed by a processor, supports out-of-order processing of events comprising:
   performing, by the processor, a plurality of out-of-order processing operations concurrently; and
   each operation of the plurality of out-of-order processing operations comprises
   determining if an incoming event is a transition associated with a current state;
   determining if the transition is out-of-order from a predetermined order of transitions supported by a state machine;
   determining if the out-of-order transition is to a reachable state that is either a state prior to the current state of the state machine or a future state from the current state of the state machine; and
   allowing the transition to be undertaken if the transition is to the reachable state,
   wherein upon determining if the out-of-order transition is to the reachable state being a state prior to the current state, the logic alters an executing state of the state machine as the prior state, performs one or more actions for entry into the prior state, performs one or more actions while executing within the prior state, and exits the prior state to revert back to the current state.

3. The state machine of claim 1, wherein the logic determines if one or more guard conditions are present being that one or more conditions need to be satisfied before allowing the transition to be undertaken.

4. The state machine of claim 1, wherein the logic further performs an action upon undertaking the transition.

5. A state machine that supports out-of-order processing of events, comprising:
   a memory to store information directed to transitions that are supported by the state machine;
   logic in communication with the memory, the logic to (i) determine if an incoming event is a transition associated with a current state, (ii) determine if the transition is out-of-order from a predetermined order of transitions supported by the state machine, (iii) determine if the out-of-order transition is to a reachable state that is either a state prior to the current state of the state machine or a future state from the current state of the state machine, (iv) allow the transition to be undertaken if the transition is to the reachable state, and (v) perform a plurality of transitions associated with operations (i)-(iv) concurrently, wherein upon determining if the out-of-order transition is to the reachable state being the future state, the logic exits the current state and subsequently alters an executing state and an operational state of the state machine to be the future state, performs one or more actions performed by the state machine for entry into the future state, performs one or more actions within the future state, and remains in the future state.

6. The non-transitory machine readable medium of claim 2, wherein each operation of the plurality of out-of-order processing operations comprises determining if one or more guard conditions are present being that one or more conditions need to be satisfied before allowing the transition to be undertaken.

7. The non-transitory machine readable medium of claim 2, wherein each operation of the plurality of out-of-order processing operations comprises performing an action upon undertaking the transition.

8. A non-transitory machine readable medium including software that, when executed by a processor, supports out-of-order processing of events comprising:

performing, by the processor, a plurality of out-of-order processing operations concurrently; and each operation of the plurality of out-of-order processing operations comprises determining if an incoming event is a transition associated with a current state;

determining if the transition is out-of-order from a predetermined order of transitions supported by a state machine;

determining if the out-of-order transition is to a reachable state that is either a state prior to the current state of the state machine or a future state from the current state of the state machine, wherein upon determining if the out-of-order transition is to the reachable state being the future state, each operation of the plurality of out-of-order processing operations further comprises exiting the current state and subsequently altering an executing state and an operational state of the state machine to be the future state, performing one or more actions performed by the state machine for entry into the future state, performing one or more actions within the future state, and remaining in the future state;

allowing the transition to be undertaken if the transition is to the reachable state.

9. A state machine that supports out-of-order processing of events, comprising:

a memory to store information directed to transitions that are supported by the state machine;

logic in communication with the memory, the logic supporting both a plurality of current states and transitions from each of the plurality of current states that occur concurrently and independently from each other, the logic to (i) determine if an incoming event is a transition of the transitions that is associated with one of the plurality of current states, the one of the plurality of current states is a current operational state; (ii) determine if the transition is out-of-order from a predetermined order of transitions supported by the state machine; (iii) determine if the out-of-order transition is to a reachable executing state that is either an executing state prior to the current operational state of the state machine or a future executing state from the current operational state of the state machine; (iv) allow the transition to be undertaken if the transition is to the reachable executing state; and (v) performing an action associated with the transition to the reachable executing state, wherein (i) upon determining if the out-of-order transition is to the reachable executing state, the logic alters an executing state of the state machine as the prior executing state, performs one or more actions for entry into the prior executing state, performs one or more actions while executing within the prior executing state, and exits the prior executing state to revert back to the current operational state, or (ii) upon determining if the out-of-order transition is to the reachable executing state being the future executing state, the logic exits the current operational state and subsequently transitions to a future operational state of the state machine, performs one or more actions performed by the state machine for entry into the future operational state, performs one or more actions within the future operational state, and remains in the future operational state.

10. The state machine of claim 9, wherein the logic determines if one or more guard conditions are present being that one or more conditions need to be satisfied before allowing the transition to be undertaken.

* * * * *